US006931292B1

(12) United States Patent
Brumitt et al.

(10) Patent No.: US 6,931,292 B1
(45) Date of Patent: Aug. 16, 2005

(54) NOISE REDUCTION METHOD AND APPARATUS

(75) Inventors: Marcia R. Brumitt, San Diego, CA (US); James M. Turnbull, San Diego, CA (US)

(73) Assignee: Jabra Corporation, Ballerup (DK)

( * ) Notice: Subject to any disclaimer, the term of this patent is extended or adjusted under 35 U.S.C. 154(b) by 796 days.

(21) Appl. No.: 09/596,700

(22) Filed: Jun. 19, 2000

(51) Int. Cl.[7] .................................... G06F 17/00
(52) U.S. Cl. ......................... 700/94; 704/226; 381/94.3
(58) Field of Search ........................... 700/94; 381/94.1, 381/94.2, 94.3; 704/226, 227, 228, 233, 206, 205

(56) References Cited

U.S. PATENT DOCUMENTS

| | | | | | |
|---|---|---|---|---|---|
| 4,061,875 | A | | 12/1977 | Freifeld et al. | |
| 4,630,302 | A | | 12/1986 | Kryter | |
| 4,811,404 | A | | 3/1989 | Vilmur et al. | |
| 4,985,925 | A | | 1/1991 | Langberg et al. | |
| 5,036,540 | A | | 7/1991 | Eastmond | |
| 5,179,623 | A | * | 1/1993 | Dickopp et al. | 704/200 |
| 5,402,496 | A | | 3/1995 | Soli et al. | |
| 5,490,233 | A | | 2/1996 | Kovacevic | |
| 5,640,490 | A | | 6/1997 | Hansen et al. | |
| 5,749,064 | A | * | 5/1998 | Pawate et al. | 704/213 |
| 5,848,171 | A | | 12/1998 | Stockham, Jr. et al. | |
| 5,970,441 | A | | 10/1999 | Mekuria | |
| 6,363,345 | B1 | * | 3/2002 | Marash et al. | 704/226 |

FOREIGN PATENT DOCUMENTS

| | | |
|---|---|---|
| WO | WO 89/06877 | 7/1989 |
| WO | WO 95/25382 | 9/1995 |

* cited by examiner

*Primary Examiner*—Ping Lee
(74) *Attorney, Agent, or Firm*—Lloyd W. Sadler

(57) ABSTRACT

A method and system for reducing the undesirable noise in a communication signal is provided. Designed specifically to address the problem of telephone communications where the desired speech signal is contaminated by background noise, this invention employs digital signal processing of the communication signal to selectively emphasize, buffer, amplify, and smooth the components of the signal, thereby enhancing the signal quality (signal to noise ratio) of the presented communication signal.

14 Claims, 12 Drawing Sheets

NOISE REDUCTION METHOD AND APPARATUS

BACKGROUND OF THE INVENTION

1. Field of the Invention

This invention relates methods and apparatus' for reducing unwanted noise in a signal. More specifically, this invention relates to methods and apparatus' for reducing noise in a telephone speech communication signal.

2. Description of Related Art

A variety of different methods of signal noise reduction are well known in the art, however typically these previously methods introduce unwanted amplitude modulation or other audible artifacts to the resulting processed signal.

The reader is referred to the following U.S. and international patent documents for general background material: WO 89/06877, WO 95/25382, U.S. Pat. Nos. 4,061,875, 4,630,302, 4,811,404, 4,985,925, 5,036,540, 5,402,496, 5,490,233, 5,640,490, 5,848,171 and 5,970,441. Each of these patent documents is hereby incorporated by reference in its entirety for the material contained therein.

SUMMARY OF THE INVENTION

It is desirable to provide a method and apparatus for reducing the noise in a telephone or telephone-like communication system. For example, it is desirable to provide a method and apparatus that reduces the noise, either systematic or background, received when a computer operator/user employs voice recognition software and equipment to give voice commands to a computer system. The noise in this system can be induced by room noise such as other users, equipment and the like, or can be induced by communication equipment, fans, cross-talk, radio reception and the like. In this example, it is desirable to provide a method that may be performed within the computer system. In an alternative example, it is desirable reduce the noise encountered by a cellular or PCS telephone system user in an automobile or other noisy environment. The noise in this example is caused by such sources as road noise, engine noise, and/or other acoustic sources such as the car radio. In this example, it is desirable to perform the noise reduction in the automobile telephone kit and will remove as much noise as possible before transferring the signal to the telephone for transmission. It is desirable to provide an apparatus and method for reducing noise in a telephone and/or telephone-like communication system.

Therefore, it is an object of this invention to provide a method and apparatus for reducing unwanted noise in a signal containing an information component and a noise component.

It is a further object of this invention to provide a method and apparatus for reducing unwanted noise in a signal that applies a time domain high frequency emphasis function.

It is another object of this invention to provide a method and apparatus for reducing unwanted noise in a signal that buffers an emphasized signal.

It is a still further object of this invention to provide a method and apparatus for reducing unwanted noise in a signal that applies a time domain windowing function to the buffered signal.

Another object of this invention is to provide a method and apparatus for reducing unwanted noise in a signal that converts windowed data from the time domain to the frequency domain to give frequency data in a number of frequency bins.

A further object of this invention is to provide a method and apparatus for reducing unwanted noise in a signal, with a spectral power calculated for each frequency bin.

A still further object of this invention is to provide a method and apparatus for reducing unwanted noise in a signal, where the overall or mean bin power can be optionally calculated.

Another object of this invention is to provide a method and apparatus for reducing unwanted noise in a signal, where the overall or mean bin power can optionally be limited to a minimal value.

Another object of this invention is to provide a method and apparatus for reducing unwanted noise in a signal, that temporally smoothes the spectral power results.

A still further object of this invention is to provide a method and apparatus for reducing unwanted noise in a signal, that transversally smoothes the temporally smoothed spectral power bins.

A further object of this invention is to provide a method and apparatus for reducing unwanted noise in a signal, that includes generating a weighting scalar for each bin based on two dimensionally smoothed spectral power bins and the optional overall or mean bin power, which may be limited.

It is another object of this invention to provide a method and apparatus for reducing unwanted noise in a signal, that includes multiplying the raw frequency bins by the weighting scalar.

It is a still further object of this invention to provide a method and apparatus for reducing unwanted noise in a signal that provides a conversion of the weighted frequency data from the frequency domain back into the time domain.

It is another object of this invention to provide a method and apparatus for reducing unwanted noise in a signal that uses a partial inverse window function.

Another object of this invention is to provide a method and apparatus for reducing unwanted noise in a signal, that applies a time domain high frequency de-emphasis function to provide a signal with reduced noise component, while maintaining an essentially unchanged information component.

A further object of this invention is to provide a method and apparatus for reducing unwanted noise in a signal, wherein the apparatus has an input for receiving an analog signal containing an information component and a noise component.

A still further object of this invention is to provide a method and apparatus for reducing unwanted noise in a signal, wherein the apparatus has a converter for converting an analog signal to a digital form.

Another object of this invention is to provide a method and apparatus for reducing unwanted noise in a signal, wherein the apparatus has a digital signal processor for performing such functions as pre-emphasis, buffering, windowing, Fast Fourier Transform, power calculations, temporal smoothing, transversal smoothing, generating weighting scalars, performing weighting of the frequency domain signal, Inverse Fast Fourier Transform, partial inverse widowing, and de-emphasis.

It is a further object of this invention to provide a method and apparatus for reducing unwanted noise in a signal, wherein the apparatus has non-volatile memory containing program instructions for the digital signal processor to perform steps of the noise reduction method.

It is another object of this invention to provide a method and apparatus for reducing unwanted noise in a signal, wherein the apparatus has an output that converts the processed digital signal back into an analog form and which transmits the signal with the reduced noise component and essentially unchanged information component.

A further object of this invention is to provide a method and apparatus for reducing unwanted noise in a signal, wherein the apparatus has support circuitry as necessary for the digital signal processor and converters, including but not necessarily limited to a clock generator and a power supply.

A still further object of this invention is to provide a method and apparatus for reducing unwanted noise in a signal, where the apparatus may have on-board random access memory for storing digital signals, buffers and intermediate calculations.

These and other objects of the invention are achieved by the method and apparatus herein described and are readily apparent to those of ordinary skill in the art upon review of the following drawings, detailed description and claims.

BRIEF DESCRIPTION OF THE DRAWINGS

In order to show the manner that the above recited and other advantages and objects of the invention are obtained, a more particular description of the preferred embodiments of this invention, which is illustrated in the appended drawing, is described as follows. The reader should understand that the drawings depict only present preferred and best mode embodiments of the invention, and are not to be considered as limiting in scope. A brief description of the drawings is as follows.

Reference will now be made in detail to the present preferred embodiment of the invention, examples of which are illustrated in the accompanying drawings.

DETAILED DESCRIPTION OF THE INVENTION

Figure 1:
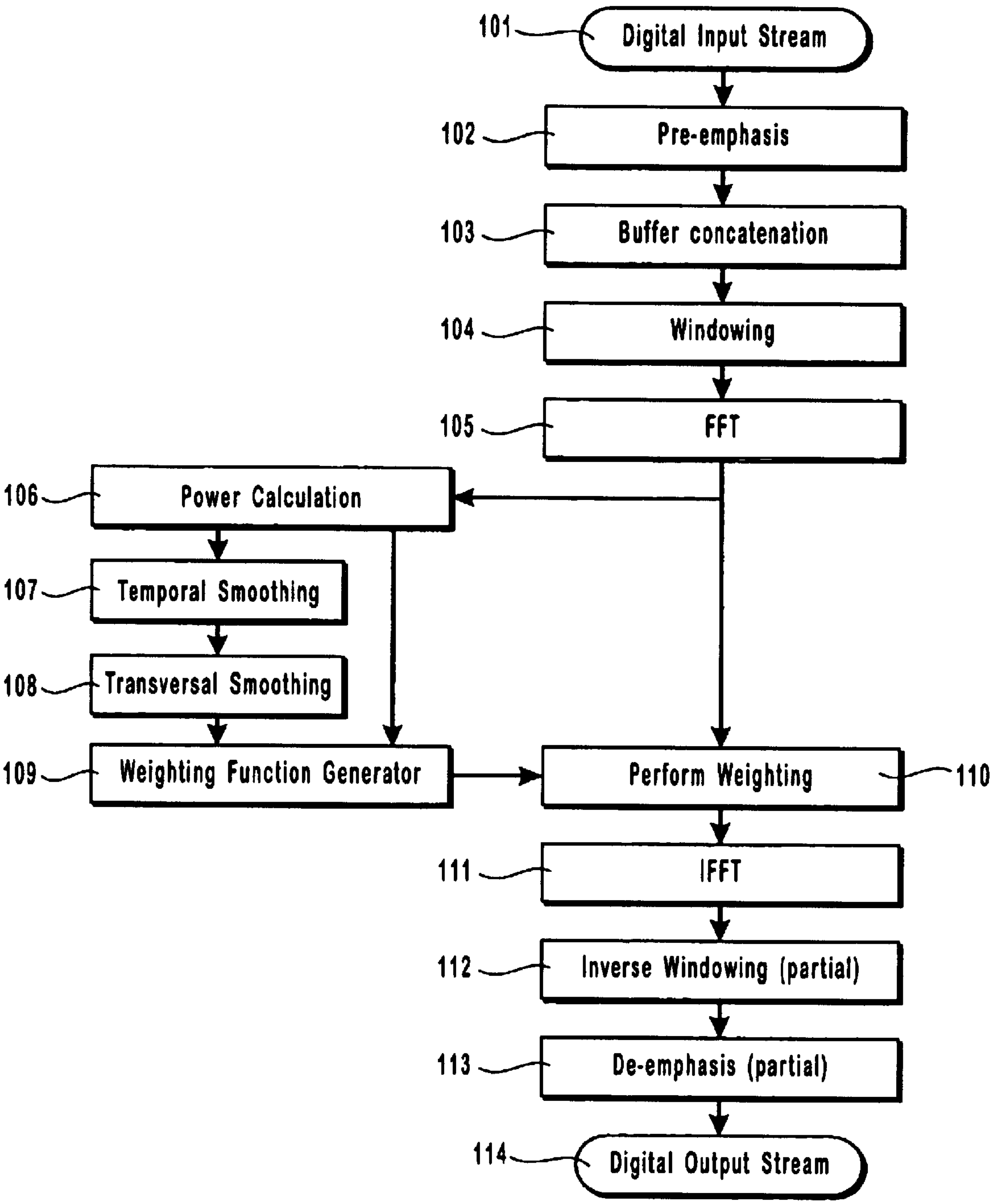
FIG. 1 is a process flow chart showing the preferred processing steps of the noise reduction method of this invention.

FIG. 1 is a process flow chart showing the preferred processing steps of the noise reduction method of this invention as well as the data flow between the processing steps. Initially, the noise cancellation algorithm receives 101 a digital data stream. The digital data stream contains the signal that is to be conditioned by this invention. In its present preferred embodiment, this digital data stream can originate from an analog-to-digital converter, from a cellular telephone providing a digital voice output or the like. The resulting digital audio signal is passed through a pre-emphasis function 102, which flattens the spectral energy of the desired signal content. Typically, this desired signal content is a voice or speech signal, although alternative signal content can be used in this invention. By way of example, the spectral energy of a speech signal rolls off at approximately 6 dB per octave. This roll off can be compensated for by applying a difference function to the signal, since low frequency components of the speech signal typically have more signal energy than high frequency components.

If s(n) is the current speech sample and s(n−1) is the previous speech sample, then the frequency compensated signal s' is given by: $s'(n)=s(n)-s(n-1)$. Hence, the high frequency components of the signal are emphasized while the low frequency components are de-emphasized.

After the signal is pre-emphasized 102, consecutive, time domain, samples from the pre-emphasized input stream are stored 103 in a buffer for block processing. Next, a windowing function 104 is applied to the time domain data stored in the concatenated analysis buffer. The purpose of windowing 104 the time domain data prior to processing using a discrete Fourier transform method (such as a Fast Fourier Transform, or FFT) is to minimize spectral leakage. Spectral leakage occurs when a frequency component of the signal does not fall exactly centrally within a frequency bin. Energy from this component can spill into neighboring bins and beyond. The simplest windowing function, which has the greatest susceptibility to spectral leakage, is the Rectangular window. A preferred and frequently used windowing function, which greatly reduces spectral leakage, is the Hanning window. A Fast Fourier Transform (FFT) step 105 is performed on the windowed 104 time domain data to transform the data into the frequency domain. The preferred FFT 105 size is 2N. The resulting frequency domain buffer has 2N frequency bins, each of which is a complex value.

Let F[0] represent the first bin and F[2N−1] represent the last bin. For further analysis, we are interested only in bins F[0] through F[N], a total of N+1 bins, which represents the positive frequency spectrum of the analyzed signal. Bins F[N+1] to F[2N−1] are further processed at a later stage of the method of this invention. F[n] is a complex number that comprises a real component Fr[n] and an imaginary component Fi[n]. The raw complex frequency data generated in the FFT 105 is passed to the Power Calculation block 106. The Power Calculation block 106 calculates an array of power estimates P[0 . . . N] corresponding to each of the bins F[0] to F[N], as follows:

$$P[n]=Fr[n]*Fr[n]+Fi[n]*Fi[n].$$

If signal normalization is required later in the Weighting block 110, the overall frame power can be calculated as:

$$Pt=P[0]+P[1]+\ldots+P[N-1]+P[N].$$

The mean power per bin is calculated as:

$$Pm=Pt/(N+1).$$

It is often desirable to apply normalization only to signals above a certain level, in which case the mean power, Pm, can be limited to a minimum value, Po. If Pm is less than Po, then Pm is sent to Po. Signal normalization is usually necessary when the background noise and speech level change with time, such as is commonly found in an automobile environment. When a car speeds up the background noise and, in particular, the road noise increases. When the level of background noise increases, the speaker automatically and naturally compensates by raising his or her voice. Fixed weighting thresholds do not tent to work particularly well in this situation. Where the background noise is somewhat constant, such as in an office environment, the speakers voice level does not tend to change substantially and, therefore, normalization may not be necessary in such an environment.

As further illustrated later in this specification, the power management of each bin can fluctuate dramatically from analysis frame to analysis frame. Note that when a plot of the power function for a particular bin is plotted against time it does not transition smoothly from one level to another. Rather, it fluctuates rapidly with time although it exhibits a general trend, which is seen to change more slowly with time. It is this relatively slow changing trend that is of particular interest in this invention. This high frequency like signal is superimposed on a low frequency signal, where the low frequency signal is the signal of interest. For this reason, a power array P[0 . . . N] from the Power Calculator 106 is applied to a Temporal Smoothing function 107, in which the data is smoothed with respect to time. Although simple averaging can be used, the preferred smoothing technique is to apply a first order digital low pass filter to each power bin. Therefore, in this invention a N+1 low pass filters, each of which smoothes the power bins with respect to frame-to-frame fluctuations, is employed. The preferred first order low pass filter used for performing the temporal smoothing is of the form:

$$Pt[n]=A*Pt'[n]+B*P[n],$$

where Pt[n] is the temporally smoothed power for bin n, P[n] is the raw power for bin n, and Pt'[n] is the temporally smoothed power for bin n from the previous frame. For N equal to 64, giving 128 point FFT analysis, and sampling at 8 kHz, it has been found through experimentation and observation that the preferred values for A and B are 0.75 and 0.25 respectively give particularly good results.

As also illustrated in later in this specification, the power measurement for each bin can also fluctuate greatly from bin to bin; i.e., the power function plotted against bin number does not transition smoothly, rather it fluctuates rapidly as the bins are traversed with increasing frequency. However, the power function also exhibits a general trend, which is seen to change more slowly with bin number, and again it is this relatively slowly changing trend that is of interest in this invention. For this reason, the temporally smoothed data from the Temporal Smoothing block 107 is passed to a Transversal Smoothing Block 108. That is, once the successive frame results are visualized on a time-frequency plot, such as a spectrogram, the transversal smoothing is oriented transversally with respect to the temporal smoothing. Although a low pass filter could be used to perform the transversal smoothing 108, the preferred transversal smoothing technique 108 in this invention is to apply a simple averaging scheme. The preferred averaging function, which performs the transversal smoothing 108 is of the form:

$$Pf[n]=(Pt[n-I]+Pt[n-I+1]+ \ldots +Pt[n]+ \ldots +Pt[n+I-1]+Pt[n+I])/(2I+1);$$

where Pf[n] is the transversally smoothed power for bin n, Pt[n] is the temporally smoothed power for bin n, and I is the number of bins prior to and after the current bin of interest that the summation for the averaging will cover. For N equal to 64, giving 128 point FFT analysis, and sampling at 8 kHz, it has been found through experimentation and observation that a value of I of 3 gives particularly good results, and is therefore the preferred value.

The smoothed power data, Pf[0 . . . N] is passed to the Weighting Function Generator 109, which generates an array of weighting scalars W[0 . . . N], W[n] being a function of Pf[n] in the non-normalized case, or W[n] being a function of (Pf[n]−Pm) in the normalized case. The Weighting Function Generator 109 uses an array of scalars that will be applied to each frequency bin of the raw FFT data. The purpose of the weighting function is to leave the frequency bins with relatively large power levels unchanged and to attenuate the frequency bins with relatively low power levels. The reader is referred to FIG. 6 for a typical weighting function. The actual weighting is performed 110 following the Weighting Function Generator 109, using data from both the Weighting Function Generator 109 and the FFT 105. Raw frequency values Fr[0] and Fi[0], the real and imaginary components of F[0], are multiplied by W[0]. Raw frequency values Fr[1] and Fi[1] are multiplied by W[1], and so on up to raw frequency values Fr[N] and Fi[N], which are multiplied by W[N]. To preserve the natural symmetry of the raw frequency data, Fr[N+1] and Fi[N+1] are multiplied by W[N−1], Fr[N+2] and Fi[N+2] are multiplied by W[N−2], and so on up to Fr[2N−1] and Fr[2N−1], which are multiplied by W[1]. The weighted FFT data, of size 2N complex values, is passed to the IFFT Block 111, to give a time domain waveform of length 2N real samples. The resulting waveform exhibits the same windowing applied by the Windowing block 104 and is passed through an Inverse Windowing block 112. The detailed characteristics of the preferred Inverse Windowing 112, is further described in relation to FIG. 5. This Inverse Windowing block 112, de-windows the center N samples of the frame to give a time domain sample of length N, which does not have any amplitude modulation. In the preferred embodiment of the invention, only the center N samples of the frame of length 2N is taken, because of the boundary discontinuities, which can be introduced by treating important low amplitude frequency components as noise and removing them.

The nature of these boundary discontinuities can be explained with an example with reference to an artificial situation, although this discussion is equally applicable to actual signal situations. If a rectangular window is applied to a fixed non-synchronous (with respect to the FFT window length) sine wave, a substantial amount of spectral leakage results. Frequently, this leakage can be seen across all frequency bins, not just those in bins adjacent or close to the main frequency bin of the sine wave (that closest to the actual frequency of the sine wave). For the most part, the leakage amplitude is small compared to that of the main bin, and hence will be removed by the noise reduction method. Leakage components close to the main bin, however, will generally be larger and will be masked favorably by the transversal smoothing and will therefore be retained or only marginally reduced. The resulting frequency plot will appear to be somewhat similar to that which would be observed had windowing been applied to reduce leakage. Therefore, when the frequency data is transformed back into the time domain, there is some amplitude variation at the frame boundaries, the central data being largely unaffected. For this reason, it is desirable to take only the central data from the processed frame.

Also, it has been observed, that it is possible to use a rectangular window function on real signals and still get reasonable results from the noise reduction method. This is generally not the case in other FFT based processing algorithms.

Following the Inverse Windowing 112, the N samples of de-windowed data is passed to the De-emphasis function 113. This De-emphasis function is chosen to undo the frequency emphasis effects of the pre-emphasis function 102. The inverse of the pre-emphasis function 102, described above, a differencing function is used to integrate the data, using the formula:

$$s'(n)=s(n)+s'(n-1);$$

where s'(n) is the new de-emphasized sample, s(n) is the current sample to be de-emphasized, and s'(n−1) is the previous de-emphasized sample. However, due to small errors introduced by using finite precision arithmetic, this integration has a tendency to drift slowly with time, eventually resulting in an overflow situation. To compensate for this drift, a DC blocking function, or high pass filter with a relatively low cut-off frequency, is combined with the integration. The resulting formula is of the form:

$$s'(n)=K^*(s(n)+s'(n-1));$$

where K is close to, but less than, 1.0. In the preferred embodiment of this invention a value of 0.984615 is reasonable for K, although other alternative values can be substituted without departing from the concept of this invention.

The N samples of de-emphasized data represents the noise reduced signal and are sent, after de-emphasis 113, to the digital output stream 114.

Figure 2A:
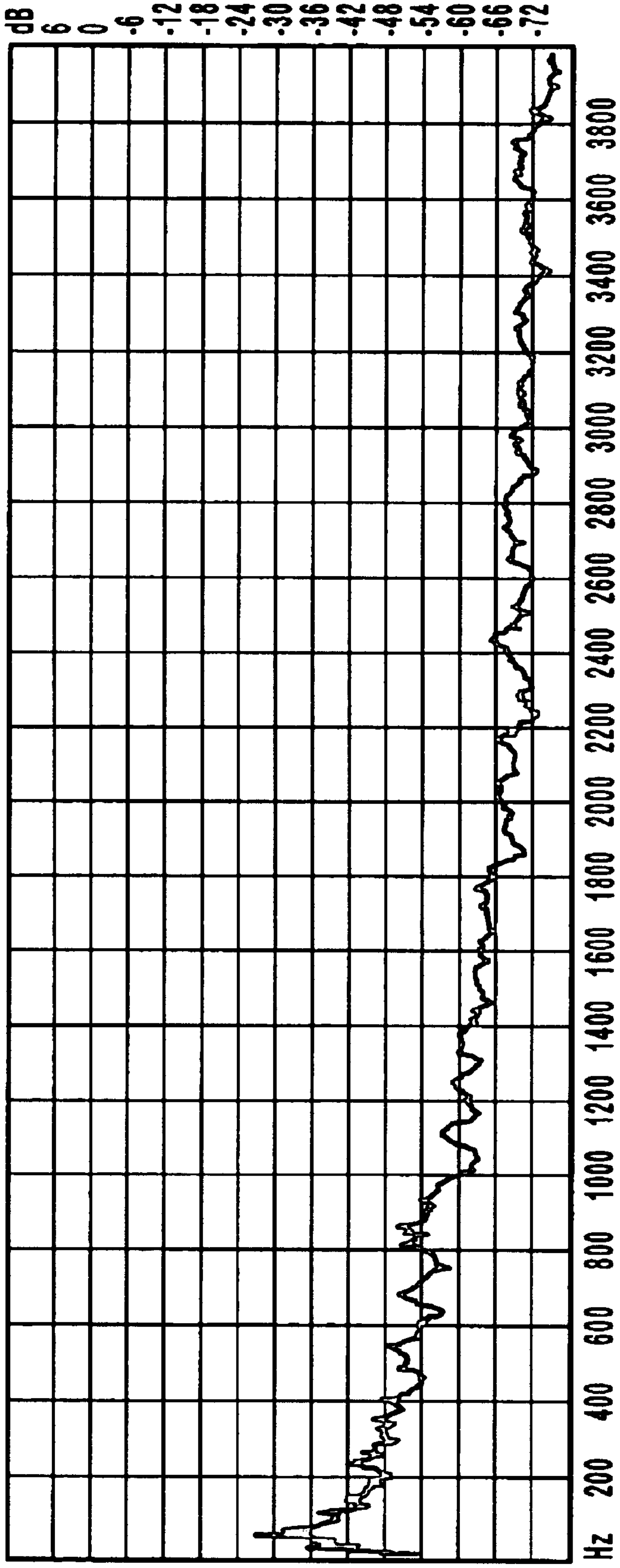
FIGS. 2*a* and 2*b* are frequency plots demonstrating the frequency leveling effects of pre-emphasis.
Figure 2B:
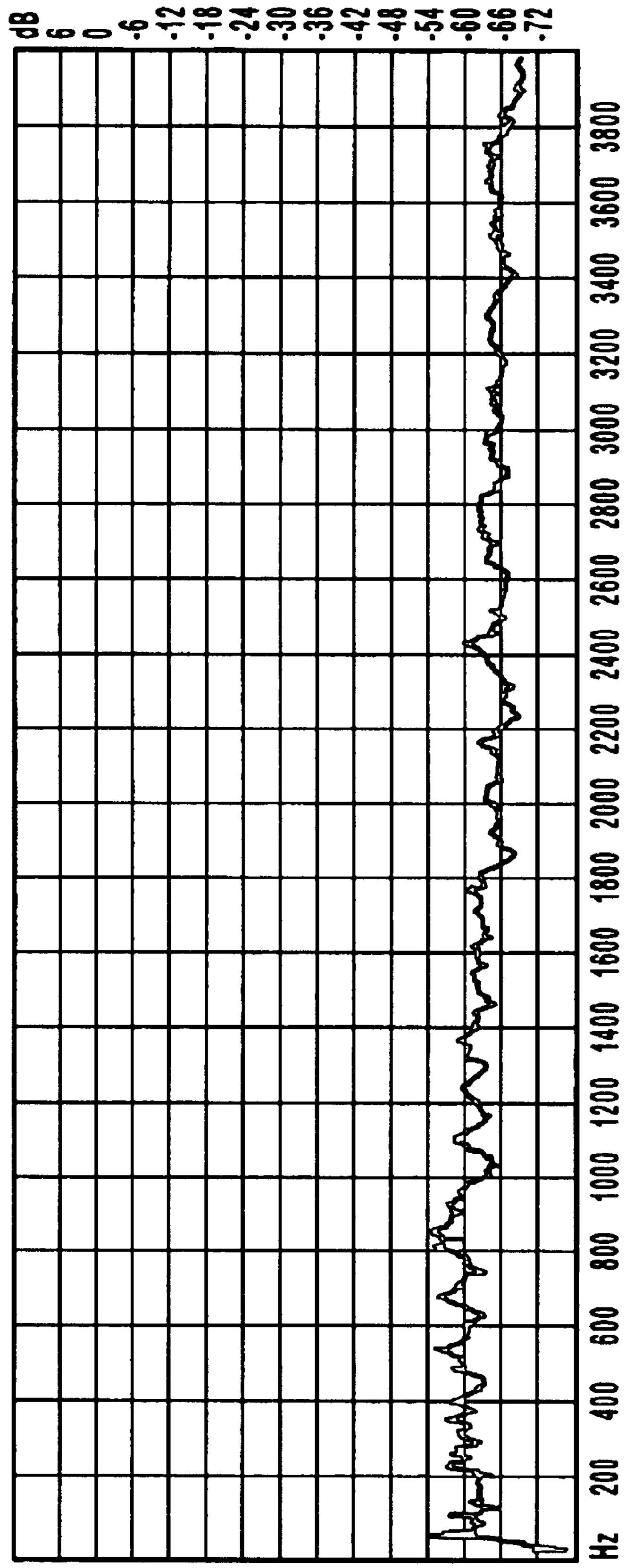

FIGS. 2*a* and 2*b* are frequency plots, which illustrate the frequency compensation effect of differencing on a speech sample. FIG. 2*a* shows the overall frequency content of a large sample of speech contaminated by road noise. This plot shows about 22 seconds of data sampled at 8 kHz. FIG. 2*b* shows the resulting frequency plot after differencing has been applied. As can quite clearly be seen, the frequency shape is much flatter after differencing.

Figure 3A:
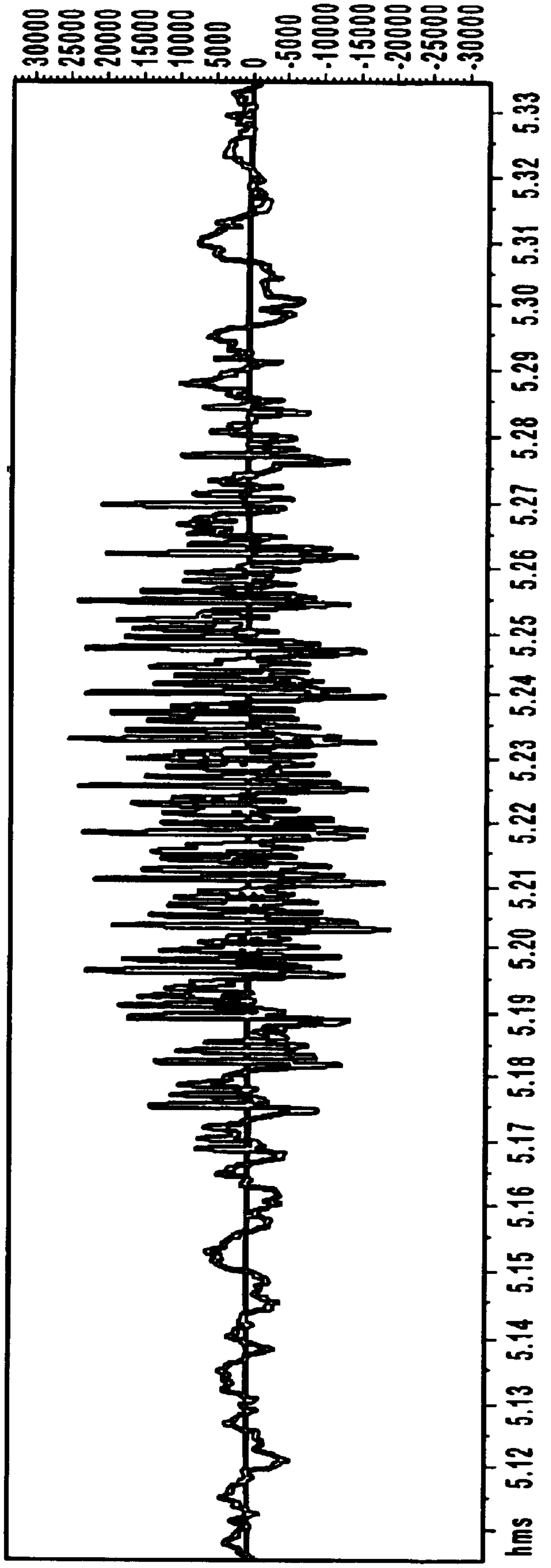
FIGS. 3*a* and 3*b* are time domain plots showing the effect of pre-emphasis on the time domain waveform.
Figure 3B:
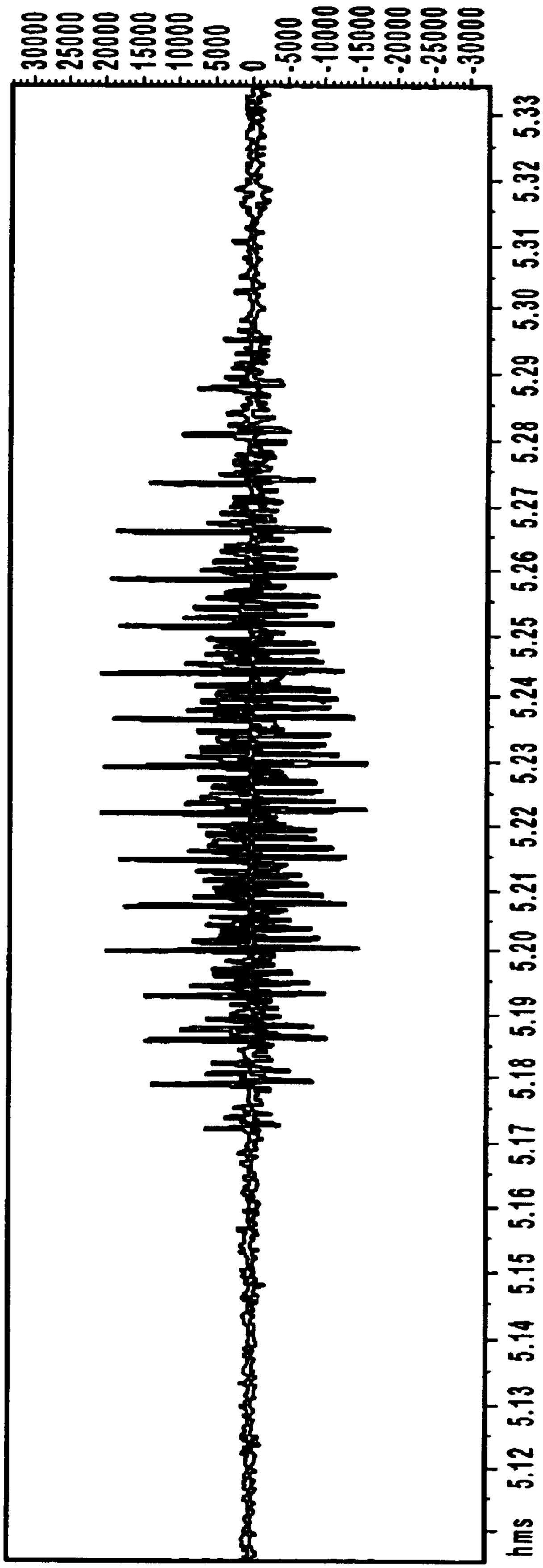

FIGS. 3*a* and 3*b* are time domain plots showing the time domain effects of pre-emphasis (differencing) on the waveform. FIG. 3*a* is a time domain plot of a short sample of speech and noise prior to pre-emphasis. FIG. 3*b* is a time domain plot of the same short sample of speech and noise after the pre-emphasis function has been applied. In the preferred embodiment of the invention, differencing is used for pre-emphasis. Differencing is the simplest pre-emphasis function, although it provides only a rough approximation of the spectral roll off of the speech signal. In alternative embodiments of the invention, if a better approximation is required a more complex pre-emphasis function can be substituted.

Figure 4:
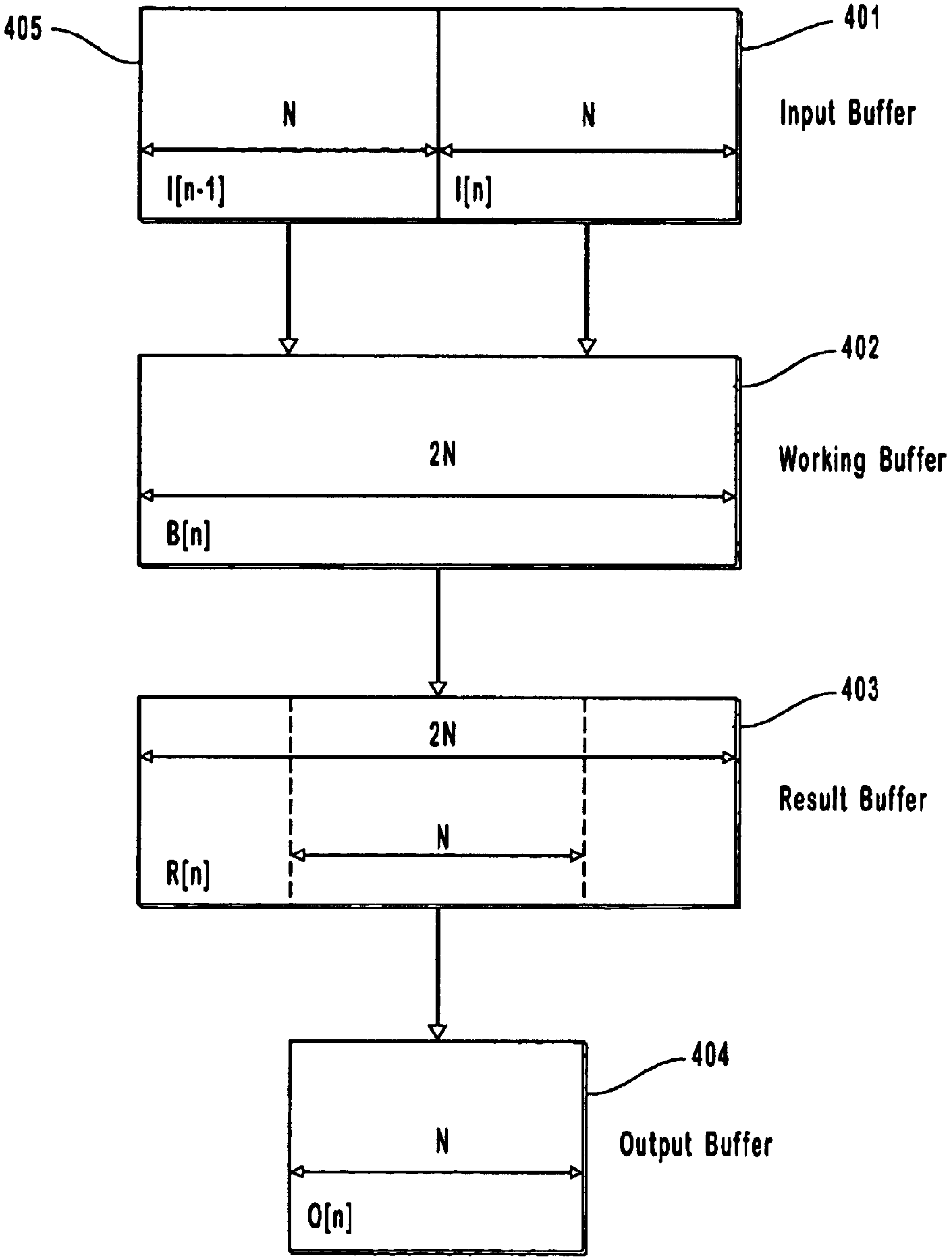
FIG. 4 is a top-level simplified block diagram of buffer handling.

FIG. 4 is a top-level simplified block diagram of buffer handling, showing the top-level steps of buffer management. In the preferred embodiment of the invention, no other processing is performed during these steps, other than data movement. First, samples from the emphasized input stream are stored in an Input Buffer I[n] 401 of size N, until the Input Buffer 401 is full. This Input Buffer 401 is concatenated with the Previous Buffer I[n−1] 405, also of size N. The concatenated buffer is copied to the Working Buffer B[n] 402, of size 2N. The Working Buffer B[n] 402 contains the input time domain data for the main analysis frame. The buffer concatenation to create a frame of data in the Working Buffer B[n] 402 provides an effective frame overlap of 50%. That is, 50% of the data for the current frame is identical to 50% of the data from the previous frame. Once I[n−1] 405 and I[n] 401 have been copied to B[n] 402, I[n] 401 is moved to I[n−1] 405 overwriting the previous contents of I[n−1] 405. I[n] 401 is now free to accept further samples from the emphasized input stream. Once the noise reduction process has been applied to the data in the Working Buffer B[n] 402 to produced the Result Buffer R[n] 403, of size 2N, the central N samples of R[n] 403 are copied to the Output Buffer O[n] 404, of size N, for transmission.

Figure 5A:
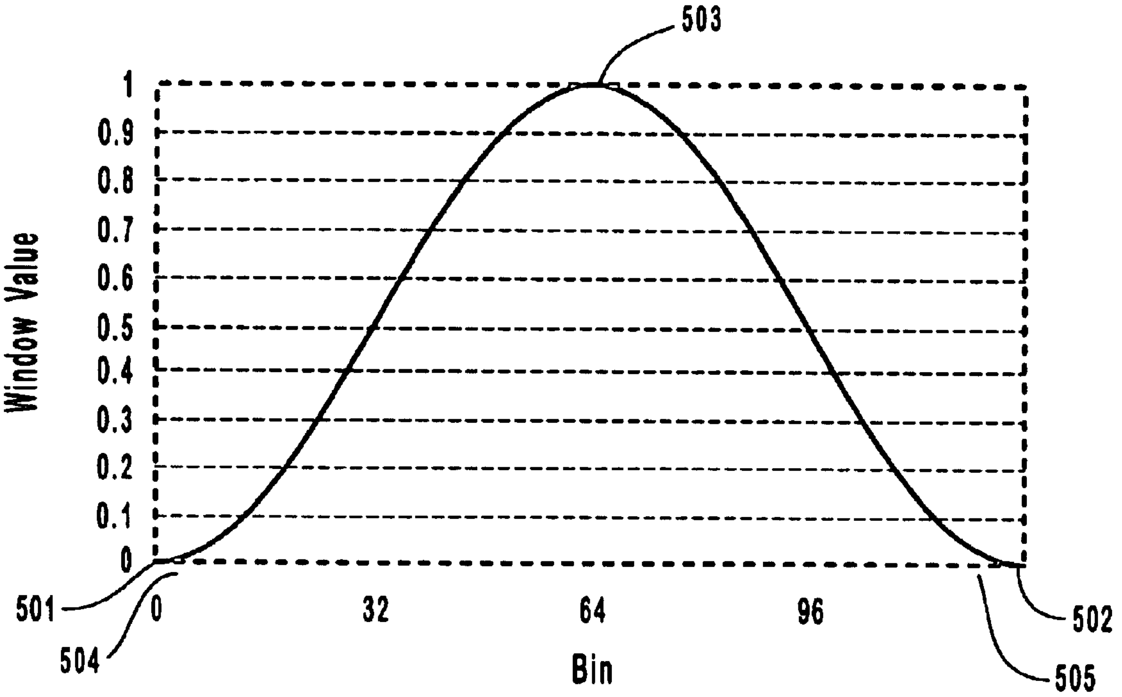
FIGS. 5*a* and 5*b* are plots of the Hanning and Inverse Hanning Window function.
Figure 5B:
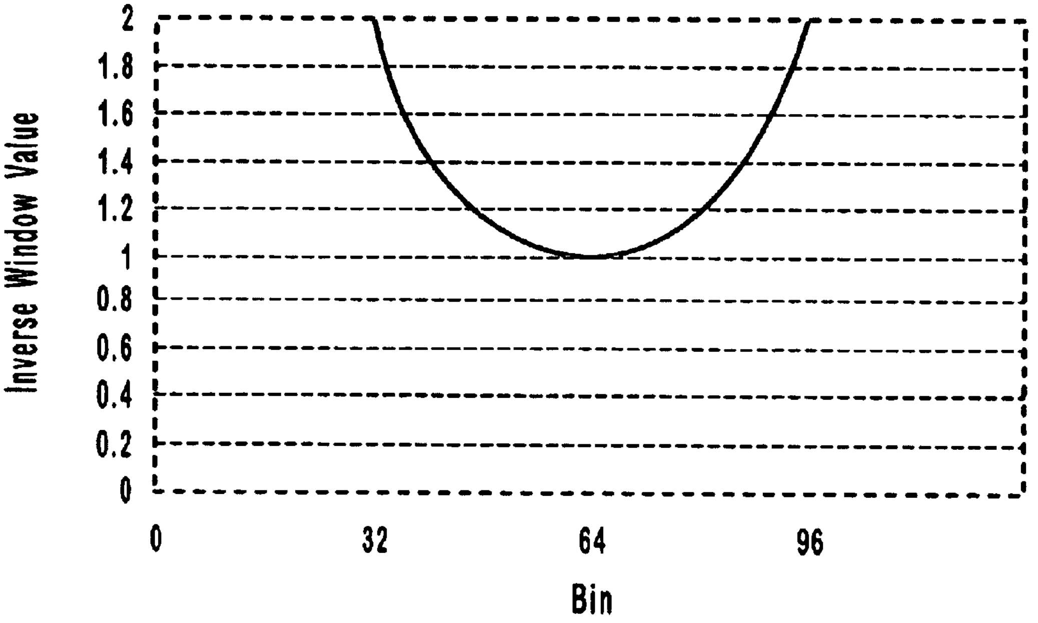

FIGS. 5*a* and 5*b* are plots of the Hanning and Inverse Hanning Window function. FIG. 5*a* shows the Hanning Window for an analysis frame of size 128. This view shows that the Window Function is zero at those endpoints 501, 502 of the window and near unity at the midpoint 503 of the window. When this Window Function is applied to the analysis frame, which in this preferred case is also 128 samples in size, samples 63 and 64 will be essentially unchanged. But moving toward the boundaries 504, 505 of the frame, the samples become increasingly attenuated, to the point where samples 0 and 127 will be zeroed, irrespective of their original value. This amplitude modulation of the analysis frame will be present after the signal has been processed in the frequency domain and is transformed back into the time domain. Since such amplitude modulation can be undesirable, after processing an inverse function of with Windowing Function is applied. Because the Windowing Function does not have an inverse for the end points 501, 502 of the frame, only the central half of the processed (Result) buffer is used. FIG. 5*b* shows the corresponding inverse function for the Hamming Window of size 128, for the central half of the function, that is, for samples 32 through 95.

Figure 6:
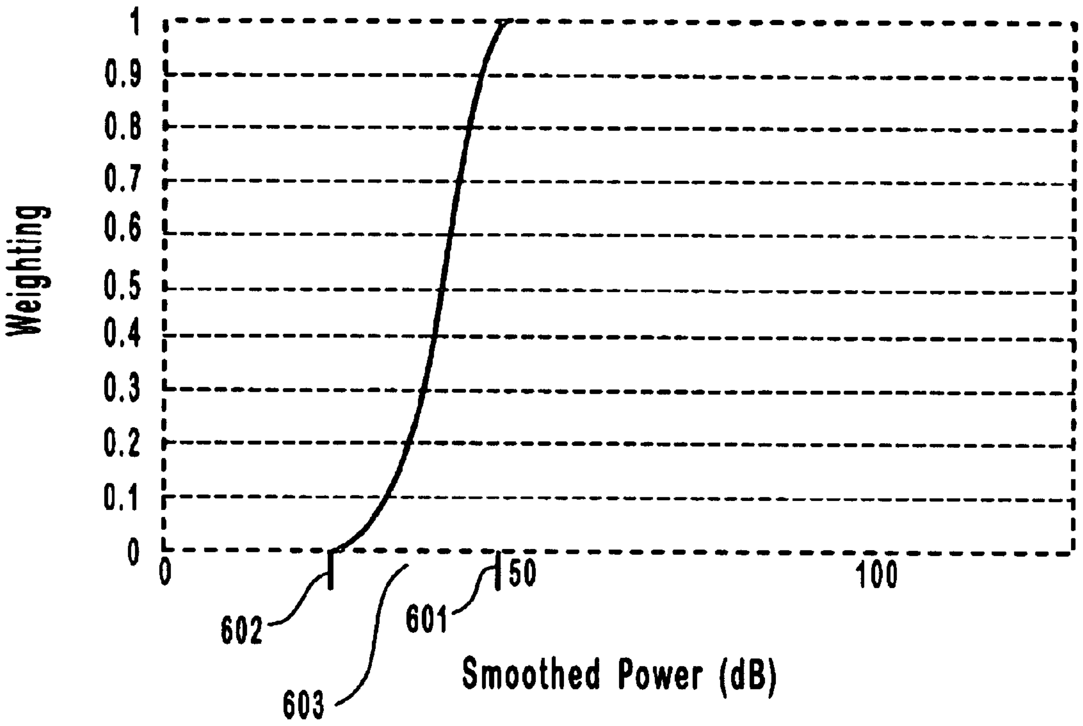
FIG. 6 is a plot of the typical and preferred weighting function of this invention.

FIG. 6 is a plot of the typical and preferred weighting function of this invention. As can be seen for this particular preferred weighting function, bins with smoothed power levels, above about 47 dB 601, are given a weighting of 1.0, that is, they remain unchanged. Bins with a smoothed power levels less than about 25 dB 602 are given a weight of 0.0, that is, they are completely attenuated. Bins with smoothed power levels between about 24 dB and 47 dB 603 are given a weighting between 0.0 and 1.0, with the lower levels having a lower weighting. When normalization is applied, periods of signal that contain only noise may be promoted above the noise cut off levels. If the overall or mean bin power is low, then normalization subtracts less power than when the desired voice components are also present. This tends to give the noise a greater normalized power than desired. To overcome this unwanted side effect of normalization, an absolute weighting may be applied. For example, if the absolute power in a particular bin is less than a particular threshold, a weighting of 0.0 may be applied irrespective of the normalized bin power. A more sophisticated absolute weighting may be applied, such as that for the normalized power. However, it has been observed through experimentation, that a simple absolute cut off threshold gives reasonable results.

Figure 7A:
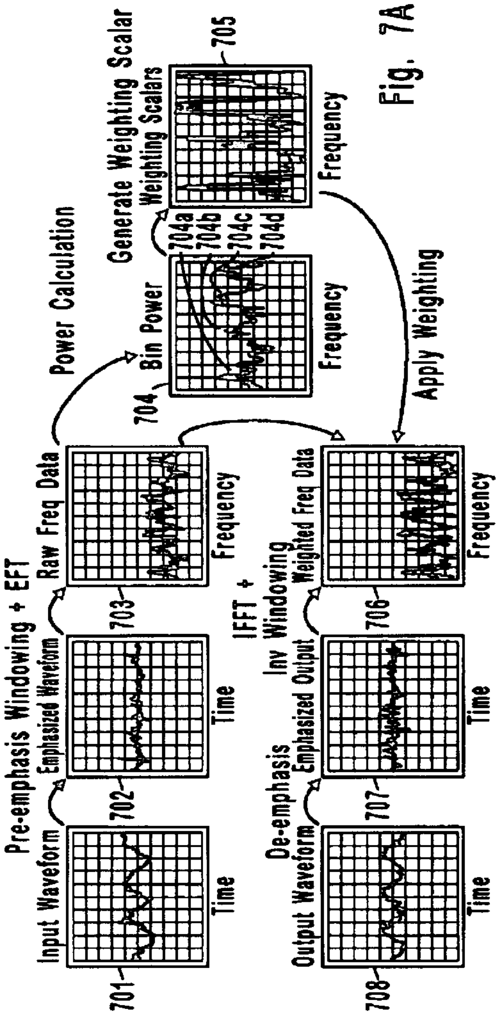
FIGS. 7*a* and 7*b* are process diagrams showing snapshots of a speech sample without the smoothing functions applied.
Figure 7B:
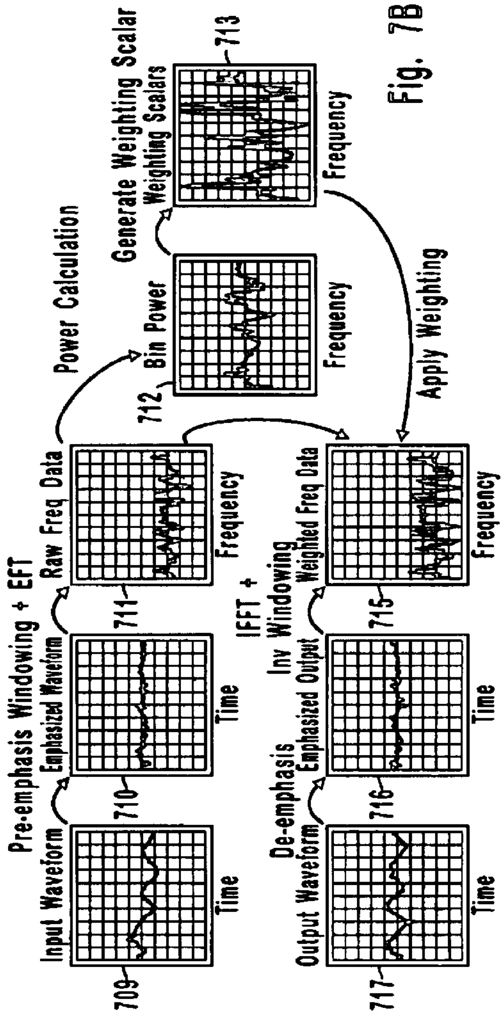

The significant improvement that smoothing gives to inter-frame continuity (across the frequency bins) and intra-frame continuity (from frame to frame) is illustrated by example in FIGS. 7*a* and *b* and 8*a* and *b*. FIGS. 7*a* and 7*b* are process diagrams showing snapshots of a speech sample without the smoothing functions applied. FIG. 7*a* shows snapshots of a first frame at each processing step (input waveform 701, emphasized waveform 702, raw frequency data 703, bin power 704, weighting scalars 705, weighted frequency data 706, emphasized output 707 and output waveform 708), while FIG. 7*b* shows snapshots of a consecutive frame at each processing step. In FIG. 7*a*, the bin power snapshot 704 shows four regions 704*a–d*, in the frequency domain, of relatively high power. However, within each of these regions 704*a–d* there is a great deal of power fluxuation. For this reason the Weighting Scalars, shown in snapshot 705, also fluctuate greatly giving a low degree of intra-frame continuity. Comparing the Bin Power plot 704 of FIG. 7*a* with the Bin Power plot 712 of FIG. 7*b*, it is clear that the overall trend is the same in both plots 704, 712, but these snapshot plots are markedly different from each other. The Weighting Scalars 705, 713 of FIGS. 7*a* and 7*b* respectively also share this trait, showing a low degree of inter-frame continuity when smoothing is not applied. FIG. 7*b* also shows snapshot plots of the process steps input waveform 709, emphasized waveform 710, raw frequency data 711, bin power 712, weighting scalars 713, weighted frequency data 714, emphasized output 715 and output waveform 716. These plots, of FIG. 7*b*, related to the frame of data, which follows that of FIG. 7*a*.

Figure 8A:
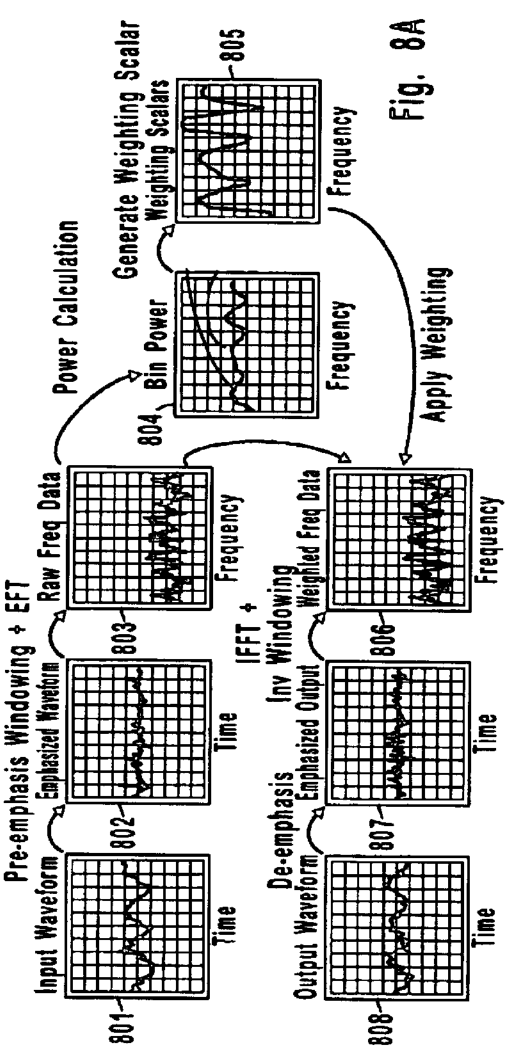
FIGS. 8*a* and 8*b* are process diagrams showing snapshots of a speech sample with the smoothing functions applied.
Figure 8B:
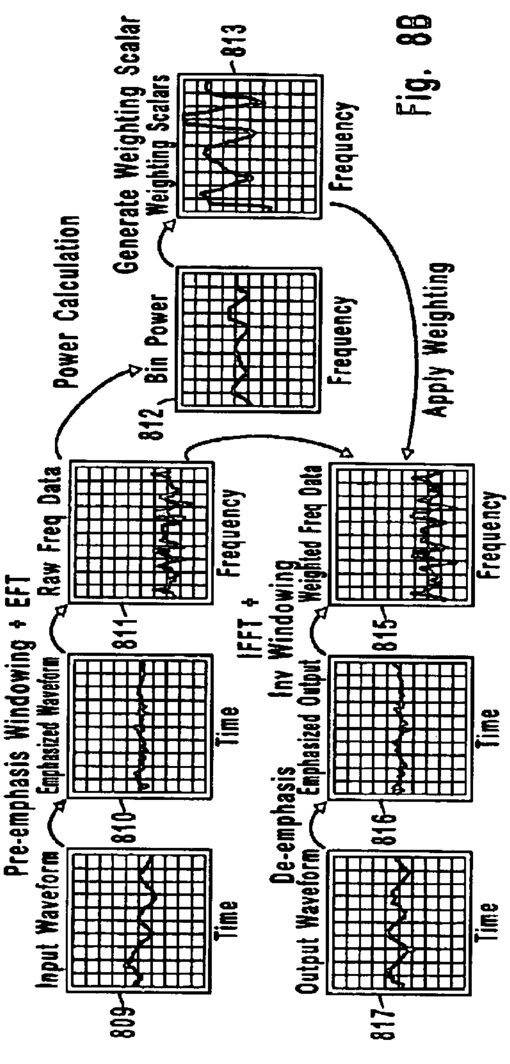

FIGS. 8*a* and 8*b* show snapshots of consecutive frames of a speech sample with the smoothing functions applied. Again, the snapshot plots of FIG. 8*a* are the input waveform 801, emphasized waveform 802, raw frequency data 803, bin power 804, weighting scalars 805, weighted frequency data 806, emphasized output 807, and output waveform 808 of a first frame. While the snapshot plots of FIG. 8*b* are the input waveform 809, emphasized waveform 810, raw frequency data 811, bin power 812, weighting scalars 813, weighted frequency data 814, emphasized output 815, and output waveform 816 of a first frame. When smoothing is applied, performing the same comparison as above regarding FIGS. 7*a* and 7*b*, it can be seen that both the Bin Power 804, 812 and the Weighting Scalars 805, 813 show a large degree of intra-frame continuity, and that the corresponding plots of FIGS. 8*a* and 8*b* have only changed slightly from frame to frame. Smoothing, therefore, enhances both intra-frame continuity and inter-frame continuity.

Figure 9A:
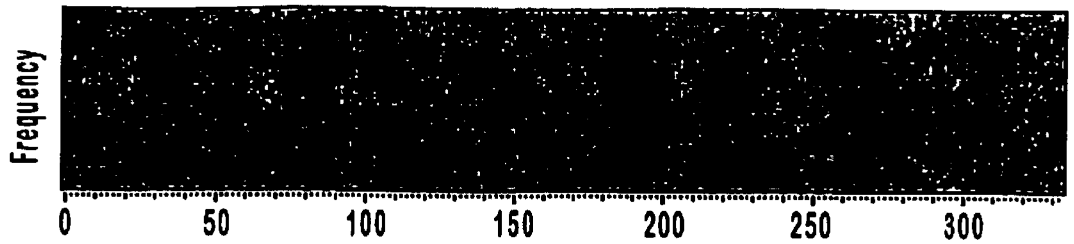
FIGS. 9*a–e* are spectrograms of a speech sample showing the results of the process of this invention with various processing.
Figure 9B:
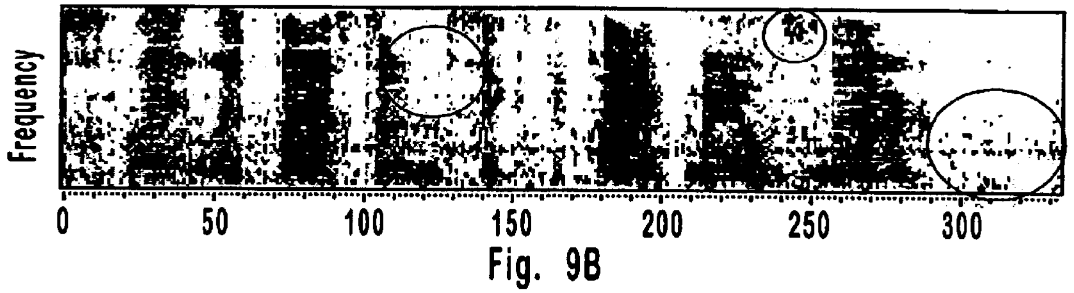
Figure 9C:
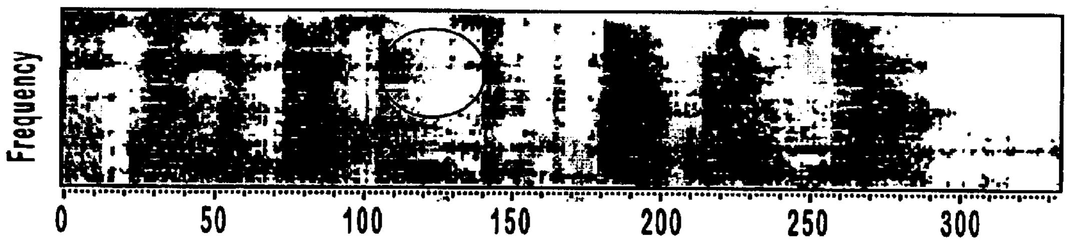
Figure 9D:
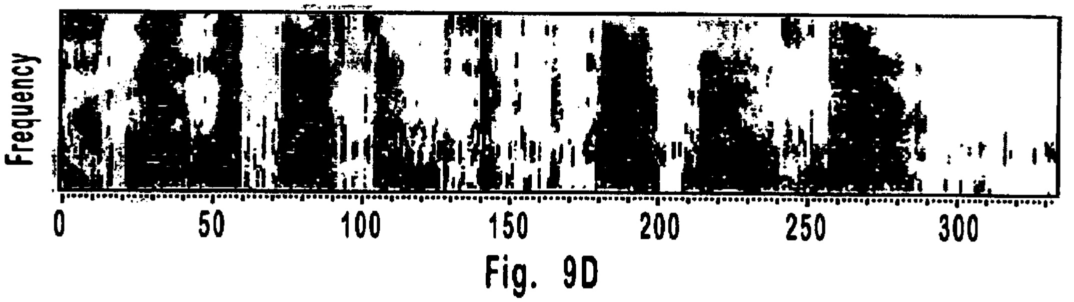
Figure 9E:
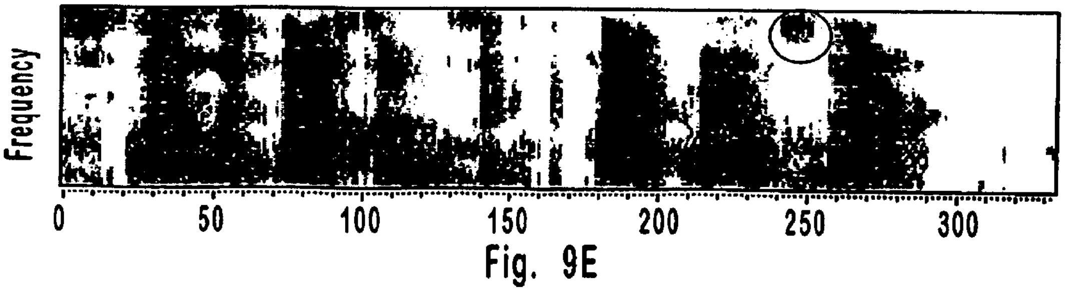

FIGS. 9*a–e* are spectrograms of a speech sample showing the results of the process of this invention with various processing. These figures further show the benefits of intra and inter-frame continuity. FIG. 9*a* shows a spectrogram of a short sample of speech with car noise. This sample is approximately 2.7 seconds long and was sampled at 8 kHz. The dark areas represent high amplitude frequency components. The lighter the area the lower the amplitude. As can be seen from the lack of white regions, the sample is immersed in a large amount of continuous wide-band noise. FIG. 9*b* shows the result of the processing without smoothing applied. It is clear, by the large regions of white areas, that most of the background noise has been removed. However, the small broken up regions of gray, such as the circled region 903, is quite undesirable. Such narrow frequency components and short duration components are unnatural and can be just as annoying and distracting to the listener as the broadband noise. FIG. 9*c* shows the effect of including temporal smoothing in the processing steps of this invention. Temporal smoothing stretches the energy of the short duration components between frames. When the noise produces an isolated, or short duration component, stretching the component's energy between frames reduces the energy in each frame and, thereby, increases the attenuation applied to the component. Moreover, temporal smoothing eliminates the abrupt cut-off seen in FIG. 9*b* 901 when the frequency bins change from speech to non-speech areas. The circled region 904 has a less abrupt cut-off. FIG. 9*d* shows the effect of including transversal smoothing in the processing steps. In this case, the energy of very narrow, and unnatural, spectral components are stretched between frequency bins, reducing isolated component energy in a particular bin and consequently increasing the attenuation applied to the isolated component. FIG. 9*e* shows the combined effect of including both temporal and transversal smoothing. As can be seen, the presence of broken up gray regions is greatly reduced. Also, transitions between speech and non-speech periods 905, with respect to both time and frequency, are less abrupt and more natural than 902.

Figure 10:
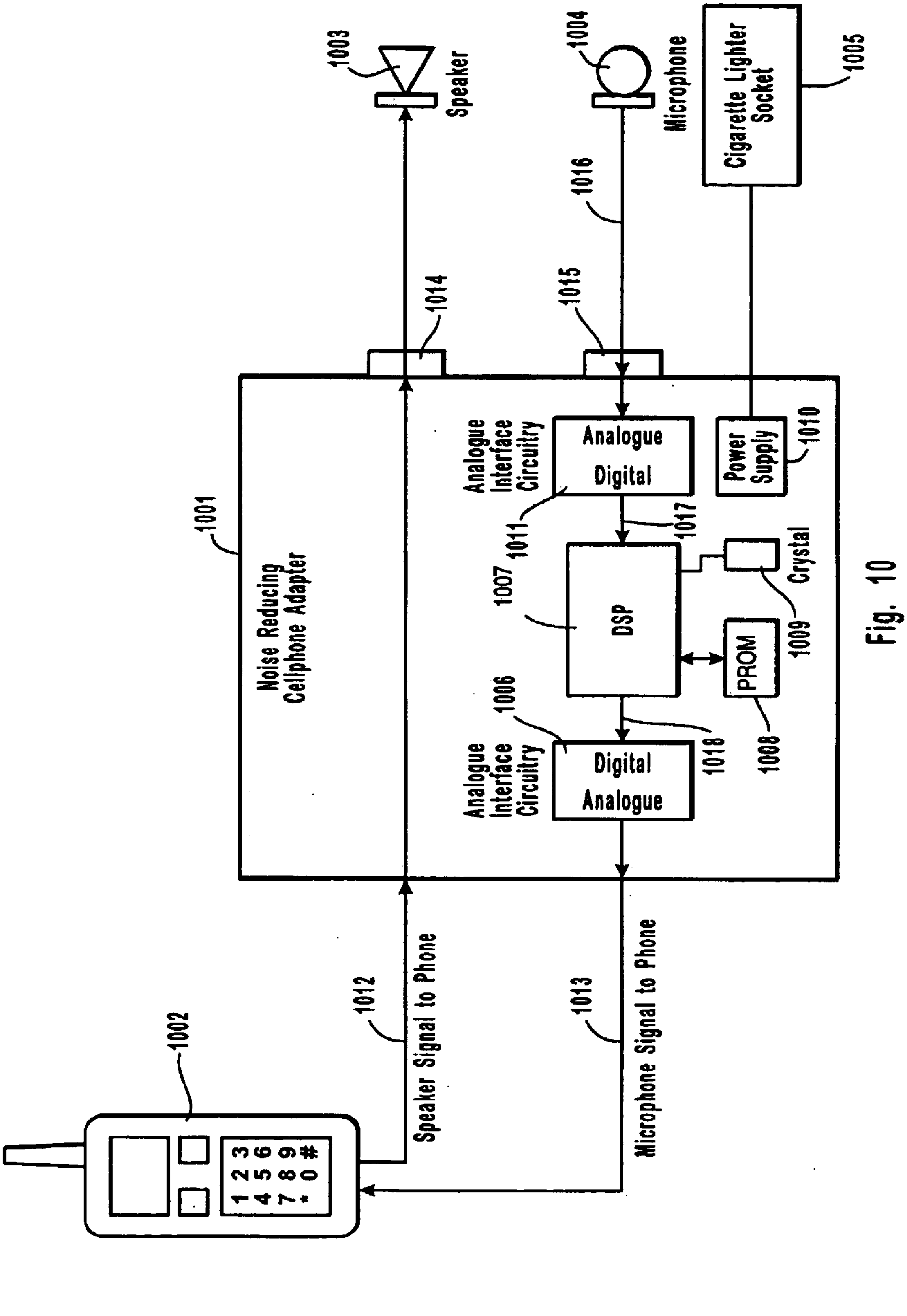
FIG. 10 is a block diagram of the preferred apparatus of this invention for the cellular telephone embodiment.

FIG. 10 is a block diagram of the preferred noise reducing apparatus of this invention, namely a noise-reducing adapter 1001 for a cellular telephone embodiment. The cellular telephone 1002 is preferably of the type that provides an analogue electrical signal for the speaker 1003 signal 1012 and accepts an analogue electrical signal 1013 for the microphone 1004 signal. The noise reducing adapter 1001 provides a connection for receiving the speaker 1003 signal 1012 from the phone 1002 and, providing that no further signal amplification is necessary, passes this signal to a connector 1014 that is compatible with the selected output speaker 1003. The noise-reducing adapter also provides an input connector 1015 for receiving an analogue signal 1016 from a microphone 1004. This analogue signal 1016 contains an information component and a noise component. The analogue signal 1016 is passed to an analogue interface circuit 1011, which amplifies the signal 1016 as necessary, provides the required level of anti-aliasing filtering, and converts the analogue signal into digital form. The digitized microphone signal 1017 is received by a digital signal processor 1007, which processes the signal to reduce the noise component using the noise reducing method previously described. The program that the DSP 1007 executes is stored in a non-volatile memory or PROM 1008. The processed digital signal 1018 is passed to interface circuitry 1006, which converts the processed digital signal 1018 back into an analogue form and performs any required signal level adjustment prior to transmitting the processed analogue signal to the phone 1002. Additional support circuitry may be required by the DSP 1007 and the converters 1006, 1011. For example, a clock generating circuit or crystal 1009 and a power supply and associated conditioning circuitry 1010 are generally required. The present preferred embodiment of this invention, also has a cigarette lighter socket 1005 for connected to a car's cigarette lighter socket, in order to provide power for the adapter 1001. Preferably, the DSP 1007 has on-board volatile random access memory for storing digital signals and intermediate calculations, as well as signal buffers.

The foregoing description is of a preferred embodiment of the invention and has been presented for the purposes of illustration and description of the best mode of the invention currently known to the inventors. This description is not intended to be exhaustive or to limit the invention to the precise form, connections or choice of components disclosed. Obvious modifications or variations are possible and foreseeable in light of the above teachings. This embodiment of the invention was chosen and described to provide the best illustration of the principles of the invention and its practical application to thereby enable one of ordinary skill in the art to utilize the invention in various embodiments and with various modifications as are suited to the particular use contemplated by the inventors. All such modifications and variations are intended to be within the scope of the invention as determined by the appended claims when they are interpreted in accordance with the breadth to which they are fairly, legally and equitably entitled.

We claim:

1. A method for reducing unwanted noise in a communication signal, comprising:

(A) receiving a digital input stream;

(B) pre-emphasizing said received digital input stream producing pre-emphasized data;

(C) storing said pre-emphasized data in a buffer;

(D) concatenating said buffer containing said pre-emphasized data to produce a frame of data;

(E) windowing said frame of data to provide data with a minimum of spectral leakage;

(F) transforming said windowed data into the frequency domain as frequency domain data, storing said frequency domain data in buffer as one or more frequency bins;

(G) calculating a power estimate for said frequency domain transformed data, wherein said calculating a power estimate further comprises (1) calculating an array of power estimates corresponding to each of said frequency bins (2) determining if signal normalization is required;

(3) if said signal normalization is required, calculating overall frame power; and (4) calculating a value of mean power per bin;

(H) temporally smoothing said power estimate to produce time smoothed data;

(I) transversally smoothing said time smoothed data to produce smoothed power data;

(J) weighting frequency values based on said smoothed power data to provide weighted FFT data;

(K) inverse transforming said weighted FFT data to provide a time domain waveform;

(L) inverse windowing said time domain waveform to provide a de-windowed time domain sample;

(M) de-emphasizing said de-windowed time domain sample to remove frequency emphasis effects from said time domain sample; and (N) generating a digital output stream of said de-emphasized data.

2. A method for reducing unwanted noise in a communication signal, as recited in claim 1, wherein said received digital input stream originates from a cellular telephone having a digital voice output.

3. A method for reducing unwanted noise in a communication signal, as recited in claim 1, wherein said pre-emphasizing flattens the spectral energy of said received digital input stream.

4. A method for reducing unwanted noise in a communication signal, as recited in claim 1, wherein said concatenating said buffer, further comprises combining a previous input buffer with said buffer to provide a frame overlap of approximately 50%.

5. A method for reducing unwanted noise in a communication signal, as recited in claim 1, wherein said windowing employs a Hanning Window function.

6. A method for reducing unwanted noise in a communication signal, as recited in claim 1, wherein said windowing employs a Rectangular Window function.

7. A method for reducing unwanted noise in a communication signal, as recited in claim 1, wherein said transforming further comprises using a Fast Fourier Transform to create one or more resulting frequency domain data frequency bins.

8. A method for reducing unwanted noise in a communication signal, as recited in claim 1, wherein said calculation of power estimate further comprises summing the squares of the real components of each frequency bin to the squares of the imaginary components of each frequency bin.

9. A method for reducing unwanted noise in a communication signal, as recited in claim 1, wherein said temporally smoothing further comprises averaging said power estimate.

10. A method for reducing unwanted noise in a communication signal, as recited in claim 1, wherein said temporally smoothing further comprises low pass filtering said power estimate.

11. A method for reducing unwanted noise in a communication signal, as recited in claim 1, wherein said transversely smoothing further comprises averaging said time smoothed data.

12. A method for reducing unwanted noise in a communication signal, as recited in claim 1, wherein said transversely smoothing further comprises low pass filtering said time smoothed data.

13. A method for reducing unwanted noise in a communication signal, as recited in claim 1, wherein said weighting frequency values further comprises:

(1) generating an array of weighting scalars; and (2) multiplying said array of weighting scalars by said frequency domain transformed data.

14. A method for reducing unwanted noise in a communication signal, as recited in claim 1, wherein said inverse transforming uses an Inverse Fast Fourier Transform.

* * * * *